United States Patent [19]

Eckler et al.

[11] Patent Number: 4,983,798
[45] Date of Patent: Jan. 8, 1991

[54] WARMING DEVICES AND METHOD USING A MATERIAL WITH A SOLID-SOLID PHASE CHANGE

[76] Inventors: Paul E. Eckler, 2705 Hulman St., Terre Haute, Ind. 47803; Richard B. Hunt, 1312 Jessamine Rd., Dade City, Fla. 33525

[21] Appl. No.: 339,779

[22] Filed: Apr. 18, 1989

[51] Int. Cl.⁵ .............................................. H05B 6/80
[52] U.S. Cl. ...................... 219/10.55 M; 219/10.55 E; 219/439; 219/462; 99/DIG. 14; 126/246
[58] Field of Search ................. 219/10.55 E, 10.55 R, 219/10.55 F, 10.55 M, 462, 439, 530, 540; 426/107, 241, 243; 99/DIG. 14, 451; 165/2, 902; 126/246, 400

[56] References Cited

U.S. PATENT DOCUMENTS

| | | | |
|---|---|---|---|
| 1,040,994 | 10/1912 | Bally. | |
| 3,539,751 | 11/1970 | Levinson | 219/10.55 |
| 3,840,153 | 10/1974 | Devlin | 222/146 C |
| 4,246,884 | 1/1981 | Vandas | 126/246 |
| 4,316,070 | 2/1982 | Prosise et al. | 219/10.55 E |
| 4,490,597 | 12/1984 | Mengel | 219/10.55 E |
| 4,567,877 | 2/1986 | Sepahpur | 126/246 |
| 4,572,864 | 2/1986 | Benson et al. | 428/305.5 |
| 4,656,325 | 4/1987 | Keefer | 219/10.55 E |
| 4,701,585 | 10/1987 | Stewart | 219/10.55 E |
| 4,710,609 | 12/1987 | Switlicki | 219/10.55 R |
| 4,743,726 | 5/1988 | Hughes et al. | 219/10.55 F |
| 4,745,248 | 5/1988 | Hayes | 219/10.55 M |
| 4,795,649 | 1/1989 | Kearns et al. | 219/10.55 E |
| 4,801,777 | 1/1989 | Auerbach | 219/10.55 M |
| 4,866,231 | 9/1989 | Schneider | 219/10.55 F |
| 4,914,717 | 4/1990 | Gibbon | 219/10.55 M |
| 4,931,608 | 6/1990 | Bills | 219/10.55 F |

OTHER PUBLICATIONS

Murrill et al., "Solid-Solid Phase Transition as Determined by Differential Scanning Calorimetry", Thermochim. Acta., 1 (1970), pp. 239-246 and 409-414, and in Thermochim. Acta, 3 (1970) 311-315.

Primary Examiner—Philip H. Leung
Attorney, Agent, or Firm—Banner, Birch, McKie & Beckett

[57] ABSTRACT

Warming devices are described having solid organic particulates that are solid at room temperature and which exhibit a meso-crystalline transition temperature within a range of about 30° to about 200° C. The particles can be heated by a variety of methods such as microwave radiation or hot liquids. Contemplated objects include vacuum bottles, coffee mugs, stadium pads, foot warming boxes, mittens, caps, snowsuits, and other wearing apparel. The solid particles act as a reusable heat reservoir to release heat over an extended period of time or absorb ambient heat and serve a protective function.

12 Claims, 3 Drawing Sheets

WARMING DEVICES AND METHOD USING A MATERIAL WITH A SOLID-SOLID PHASE CHANGE

FIELD OF THE INVENTION

The invention relates to containers for storing hot foods and beverages and to warming devices using a solid polyol as a heat energy reservoir.

BACKGROUND OF THE INVENTION

Hot food storage containers have generally taken the shape of a double walled cylinder with a vacuum or air between the walls. Typically, these containers are first preheated in a stream of hot liquid, i.e. hot tap water, to minimize cooling of the stored food before reaching a container-food temperature equilibrium. Heat is then lost to the environment from both the stored food and the container in relation to the container design and materials of construction. The container is usually designed to resist such heat loss with materials and geometries that passively retain heat.

Similar comments can be made with respect to warming devices that use a plurality of pockets and reflective layers: these "empty" structures passively resist heat loss. Some of the known warming devices are not "empty", however, but are composed of a gel sealed in a soft plastic pouch. Water in the gel can be preheated by conduction, e.g., in warm water, as an active source of heat for the device.

Unfortunately, the integrity of the container seal is crucial to the usefulness of gel containing devices. Leaks and punctures allow the gel to escape thereby rendering the device messy and virtually impossible to repair. Because the gel is difficult to clean from the pouch exterior, sealing tapes cannot be assured of closing off the leak as most adhesives will not bond to the plastic pouch through even a minute layer of residual gel. It is more expedient to discard the leaking pouch than to attempt repairs.

It would be desirable to have an insulation container that could store hot foods for long periods of time without substantial loss of heat.

It would also be desirable to provide a warming device that could be sealed easily in a variety of shapes without substantial mess or repair difficulties if a leak developed.

SUMMARY OF THE INENTION

It is an object of the invention to provide storage containers and warming devices that use a reservoir of heat energy which releases heat over an extended period of time.

It is another object of the invention to provide solids that will act as a reservoir for heat energy in storage containers and warming devices which can be heated in a microwave oven.

In accordance with these and other objects that will become apparent from the description below, storage containers according to this the invention comprise a food storage volume, a particle storage volume at least partially in heat exchange communication with said food storage area, and discrete particles of a solid organic particulate material that is solid at room temperature and exhibits a mesocrystalline transition temperature within a range of about 30° to about 200° C., said organic particulate material being disposed in said particle storage volume. A warming device according to the invention a contact layer and the organic particulate material described above in heat exchange communication with said contact layer.

The organic particulate material according to this invention can be loaded with heat energy for release of sensible heat over an extended period of time. The heated material is used as an active body of sacrificial heat for storage containers of hot foods or warming devices for items, bodies, or body parts. The containers and devices are lightweight and easily sealed in the event of a leak.

DETAILED DESCRIPTION

Figure 1:
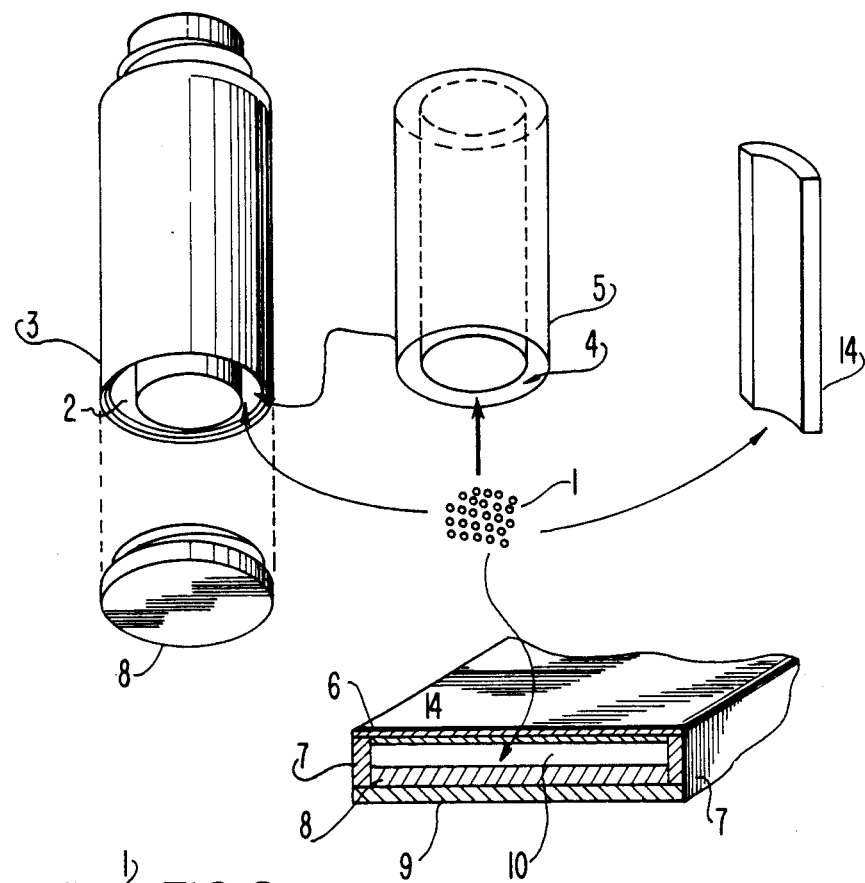
FIG. 1 illustrates the use of plastic crystal particles in a food storage container and in a warming device according to the invention.

The organic particulates useful in the invention are characterized by a mesocrystalline phase transition temperature within a range from about 30° C. to about 200° C. Materials having a transition temperature both higher and lower than this range depending on the particular application desired. For food storage containers and food warming devices, materials having a transition temperature of about 70° C. to about 200° C. are preferred. Personal warming devices, i.e. for contact with covered or uncovered human or animal body tissues, preferably use materials with a transition temperature of about 35° C. to about 100° C. depending on the device structure and circumstances.

The mesocrystalline phase of the organic particulates according to the invention represents a solid transition state before melting. The transistion temperature is detected by the transition exotherm from conventional differential thermal analysis. See, Murrill et al., "Solid-Solid Phase Transition as Determined by Differential Scanning Calorimetry", *Thermochim.Acta.*, 1 (1970) pp. 239-246 and 409-414, and in *Thermochim.Acta.*, 3 (1970) 311-315. The detected solid-solid phase change reversibly stores and releases enthalpy within the crystal structure. It is this energy reservoir which the instant warming devices use as a dynamic source of heat to insulate hot foods against cooling, protect body parts from cooling, protect body parts from excess heat in hot environments, and add heat to cooler bodies or foods.

Table 1 lists a plurality or organic particulates which exhibit a mesocrystalline phase change when heated. Other suitable materials readily may be designated by routine differential thermal analysis tests as described above. Many of the listed organic particulates are polyols which represent a preferred class of materials. Most preferred among the polyls are trimethylolethane, pentaerythritol, neopentylglycol, and mixtures thereof in a single device. Trimethylolethane is especially preferred because it has very low toxicity and is commercially available.

TABLE 1

| MATERIAL | Transition Temperature (°C.) |
|---|---|
| Neopentylglycol | 40–43 |
| Monofluoropentaerythritol | 68–72 |
| Hexachloroethane | About 71 |
| Diaminopentaerythritol | 68–73 |
| $(CH_3)_2C(CN)$—$(CH_3)_2C(CN)$ | 71–73 |
| $(CH_3)_2C(Cl)$—$(CH_3)_2(Cl)$ | 75–100 |
| Monoaminopentaerythritol | 86–91 |
| Trimethylolethane | About 81 |
| 2-amino-2-methyl-1,3-propanediol | 79–80 |
| 2-hydroxymethyl-2-nitro-1,3-propanediol | 79–80 |
| $(CH_3)_2C(CO_2H)$—$(CH_3)_2(CH_2OH)$ | 108–111 |
| Tris(hydroxymethyl) acetic acid | 124–127 |
| 2-amino-2-hydroxymethyl-1,3-propanediol | 131–134 |
| Dimethylpropionic acid | 152–155 |
| Pentaerythritol | 181–183 |

Heat energy may be introduced to the particles by conduction, convection, or radiation. For example, the particles may be transformed into their mesocrystalline phase with a preheated liquid (e.g. hot coffee to be stored in the container), a heated oven, and/or by subjecting the entire device or a sealed insert of the particles to microwave radiation. For example, a cylindrical beverage container having about 120 gms. of trimethylolethane can be irradiated for about 5 minutes in a microwave oven of 160 watts to induce a mesocrystalline phase change according to the invention.

The organic particulates preferably are used in the form of discrete solid particles. For convenience, the term "particles" will be used herein to describe crystals, aggregates, spheres, pellets, and all other particulate shapes. A particulate form is advantageous because compartments containing solids are easier to seal than compartments holding either liquids or gases. Organic materials that remain solid throughout the heating represent a preferred form of the invention. However, nothing prevents the use of a seal or sealing means which is sufficient to contain some quantity of melted material. Suitable sealing means include liquid tight apparatus connections and encapsulation materials for the organic particulates. Exemplary encapsulation materials are thermoset plastics such as urea-formaldehyde, epoxies, and phenolic resins.

The warming devices according to the invention may be constructed of virtually any material which can withstand the actuating method and heated particle temperature. Exemplary construction materials include steel; aluminum; plastics such as glass fiber-reinforced polyesters ("fiberglass") phenolic, melamine or other thermosetting resins; ceramics; glasses; and sturdy textiles or fabrics. As one in this are will understand, the device size, plastic particle type and weight, container geometry, and storage environment will all affect the heat loss rate of the device. Preferably, the device is suitably constructed to release the retained heat in a controlled manner over about 1 to about 6 hours at temperature of about 35° to about 70° C.

Warming devices having the form of food storage containers may exhibit virtually any shape having at least one enclosed space in the container. Preferably, the side, bottom, and top of the container are constructed to have particle storage compartments in heat exchange communication with a food storage volume. Desirably, the storage volume is located in the center of a surrounding volume of particles. Traditional insulating fabrics, fibers, and air space entrapping means may be used as a third layer around the particle space as passive insulation. Plastic crystal materials can be loaded into the appropriate compartments as loose particles or they may be sealed in removable inserts which are shaped to fit the compartments. Such inserts are particularly useful for food containers made of metal which should not be irradiated in a conventional microwave oven without special measures.

When used in other warming devices, the particles may be located in, for example, a pad as a layer. Insulation or radiation barriers may be used on the bottom and sides of the pad (e.g., natural or synthetic fibers, and/or reflective foil surfaces) to direct heat upwardly or, if constructed as a wrap, toward the wrapped item or body part. Such particle layers in combination with appropriate directing means are particularly convenient for stadium seats, portable pads used by hunters or fishermen in cold environments, or as emergency wraps for hypothermia victims.

In addition, the exterior surface layer of the warming device which actually is contacted by the user (the "contact" layer) may be made of a temperature regulator material which tempers the released heat to provide a comfortable contact temperature. Suitable regulating materials include cotton, polyester, and/or wool in the form of mats or a plurality cloth layers.

Other warming devices in which solid particles according to the invention may be disposed include baskets or boxes for foot warming, mittens, shoes, caps, ear muffs, snowsuits, or other personal wearing apparel. Suitable geometries and particle weights for each of these devices are readily determinable.

The particulate materials according to the invention may also be disposed in food dishes or warming trays. Such food dishes or warming trays can be used in locations where electrical outlets and/or externally powered heat sources cannot be used. Such higher temperature applications preferably use plastic particles having a relatively high mesocrystalline phase transition temperature, e.g., about 70° C. to about 200° C. Pentaerythritol and dimethylpropionic acid are particularly preferred materials for food tray applications. Infrared lights may be used to augment the heat retention by the food but they are not absolutely necessary.

Certain structural details and spatial relationships according to the invention are conventionally described with reference to the figures.

FIG. 1 illustrates the placement of discrete solid plastic crystal particles 1 in annular volume 2 of food storage container 3 exhibiting the shape of a double-walled cylinder. Particles 1 may be placed in annular volume 2 as loose particles or enclosed within volume 4 of removable insert 5 shaped to fit within annular volume 2. Particles 1 may also be disposed within a sectional insert 14 that is shaped to fill only a portion of annular volume 2.

Figure 2:
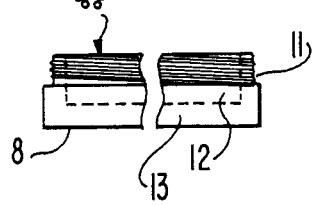
FIG. 2 shows a particle storage compartment in the bottom cap for the storage container of FIG. 1.

Particles 1 may also be disposed loosely or within an insert into bottom cap 8 (FIG. 2) comprising particle storage volume 12, insulating end portion 13, and threads 11. The bottom of container 3 can be threaded to mate with cap 8 or container 3 and cap 8 may use some other form of mating arrangement which does not allow particles 1 to leak from annular volume 2.

Insert 5 or sectional insert 14 may be constructed of a variety of materials. For example, plastic, glass, metals, or ceramics may be used.

Particles 1 may also be disposed as a layer 10 in pad-shaped warming device 14. Side barriers 7 and bottom barrier 8 are desirable means for directing heat from layer 10 through temperature regulating layer 15 of contact layer 6. Regulating layer 15 can be constructed to perform a partial insulating function and to restrict the temperature of contact layer 6 to a comfortable temperature range for contact with body parts, e.g., about 35°-100° C. Less insulative function and, therefore, higher contact temperatures may be desirable if warming device 14 is to be wrapped around food dishes or other items where comfort is not at issue. Bottom cushioning 9 provides softness and flexibility to device 14 when configured as a seating pad.

The following examples are included to illustrate the invention. It is not intended that the examples will limit the scope of the invention.

EXAMPLE 1

Energy Storage Comparison

Three identical test devices of three concentric containers were constructed. The outer container of each was a one-quart can (dimensions 12.5 cm high by 10.7 cm diameter). The second container was a 400 ml Pyrex beaker (standard Griffin form). The third container was a 50 ml Corex glass tube (dimensions 12 cm high by 2.8 cm diameter). The outermost annular space (between the beaker and the can) was filed with glass wool insulation. The Corex glass tube was secured in the center of the beaker by a piece of copper wire attached to small holes punched in the can near the rim.

The second annular space of first device filled with 220 g of granular adipic acid (a material that does not exhibit a mesocrystalline transition temperature), 220 g. of granular TME was used in the second device, and the space in the third device was left empty.

The three devices were placed in an oven at 100° C. and heated overnight. The next morning, a flask of deionized water was heated to boiling. The three preheated devices were removed from the oven, and the inner container of each was quickly filled with the boiling water. The top of each assembly was covered with a pad of glass wool to provide insulation. Temperatures of the three devices were then recorded with matched thermometers as a function of time. Room temperature on the day of the experiment was measured at 20.5° to 23.5° C.

The conditions were chosen to compare the performance properties of the three arrangements as fairly as possible. All three assemblies had identical dimensions and construction to avoid differences caused by convection effects.

Adipic acid was chosen as an inactive comparison material to TME because adipic acid has a reported bulk density similar to that of TME. Therefore, equal weights of materials could be used by filling to similar levels.

Weight differences were monitored carefully during construction of the assemblies to avoid errors caused by heat capacities. The three finished assemblies (prior to filling) were within 10 g of the same weight.

Figure 3:
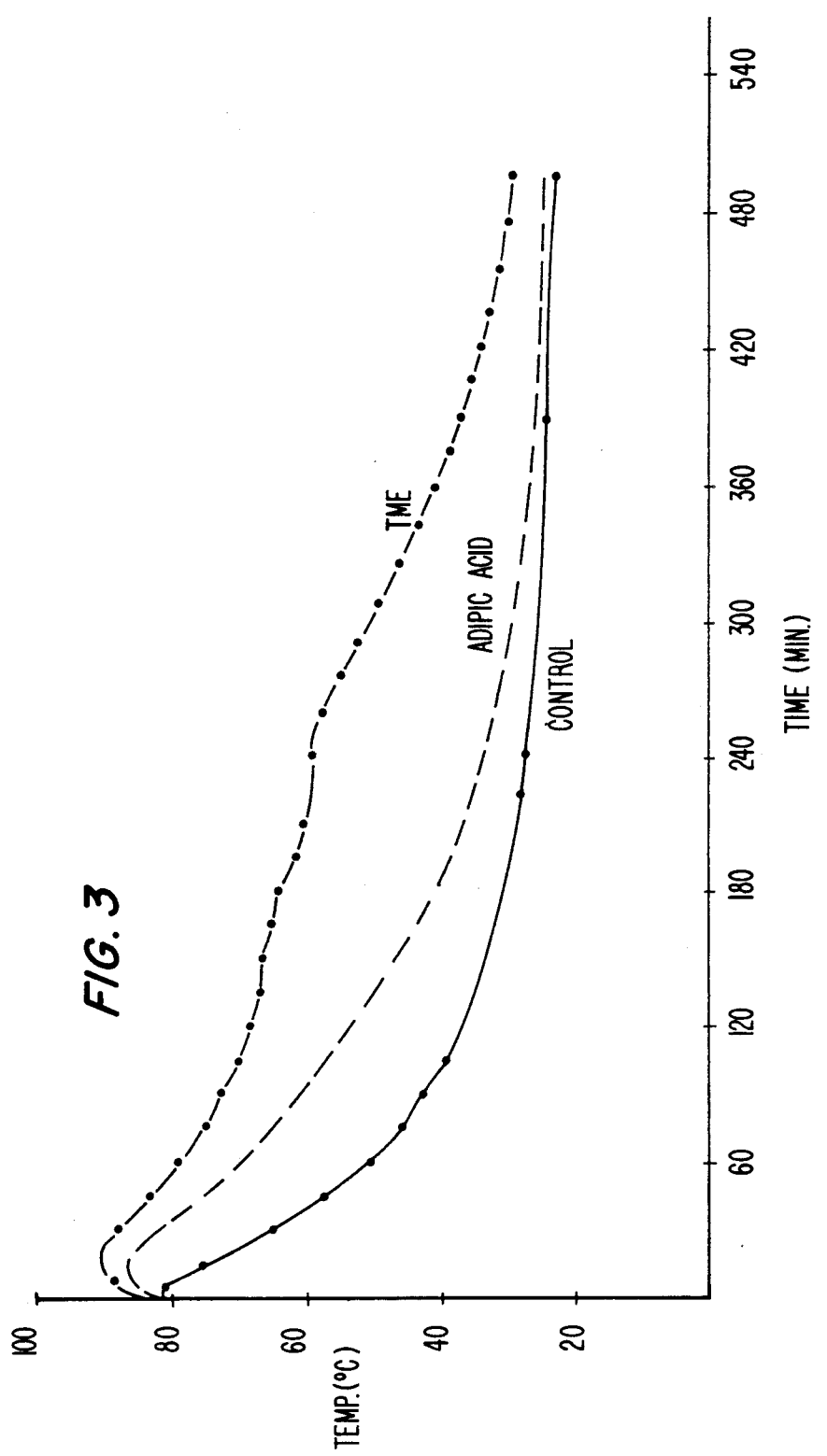
FIG. 3 depicts the use of preheated trimethylolethane in a food storage container.

The results of the test are shown in Table 2 and in FIG. 3.

TABLE 2

| TIME (min) | TEMPERATURE (°C.) | | |
|---|---|---|---|
| | CONTROL | ADIPIC ACID | TME |
| 0 | 81 | 80 | 84 |
| 5 | 81 | 85 | 87.5 |
| 15 | 75 | 87 | 91 |

TABLE 2-continued

| TIME (min) | TEMPERATURE (°C.) | | |
|---|---|---|---|
| | CONTROL | ADIPIC ACID | TME |
| 30 | 65 | 82 | 88 |
| 45 | 57 | 75 | 83 |
| 60 | 51 | 70 | 79 |
| 75 | 46 | 65 | 75 |
| 90 | 43 | 62 | 73 |
| 105 | 39 | 58 | 70 |
| 120 | — | 53 | 68 |
| 135 | — | 50 | 67 |
| 150 | — | 46 | 67 |
| 165 | — | 44 | 65 |
| 180 | — | 41 | 64 |
| 195 | — | 39 | 62 |
| 210 | — | — | 61 |
| 222 | 28 | 35 | — |
| 242 | 27 | 33.5 | 59 |
| 390 | 24 | 26 | 37 |
| 497 | 23 | 24 | 29 |
| 1407 | 20.5 | 20.5 | 20.5 |

As is apparent from Table 2 and FIG. 3, the empty container cooled most quickly. The temperature fell below 60° C. (140° F.), a reasonable temperature for a hot food or beverage, in about 38 minutes. The curve also followed the shape expected from Newton's law. The temperature approached room temperature asymptotically.

The cooling curve adipic acid was shifted as shown in FIG. 3. This effect was expected due to the heat capacity of the added solid. The quantity of heat retained by a substance is known to be a function of the mass of the substance. Therefore, the mass added to the assembly as adipic acid would be expected to absorb more heat in the oven compared to the empty assembly. The result would be expected to be a similar cooling curve, but with cooling delayed by the greater quantity of heat contained in the adipic acid. The adipic acid container passed 60° C. at approximately 95 minutes. Therefore, the addition of adipic acid retained the heat 2.5 times longer than an empty container.

By the same reasoning, the curve for TME should have been nearly identical to that of adipic acid. However, as shown in FIG. 3, this did not occur. Instead, a bulge appeared in the cooling curve. This bulge is due to the additional heat given off by the phase change from a mesocrystalline form upon cooling. Therefore, the TME particles released both stored heat and their heat capacity heat. Further, the temperature at which this heat is released, 60°-80° C., is quite desirable for maintaining the temperature of hot foods.

The efficiency of TME as a food storage container warming medium can be estimated from FIG. 3. Measuring on the 60° C. line, TME is capable of maintaining a body at 60° C. for about 223 minutes which is about 2.3 times longer than the inactive solid and about 5.9 times longer than an empty container.

It should be noted that the time scale of Table 2 and FIG. 3 is not absolute. Variations in the design of the container, the size of the various compartments, the efficiency of the outer insulation, and the shape of the container will cause the time scale to change. However, the relative position of the three curves should not change significantly.

EXAMPLE 2

Heating Pad

The use of TME filled pads for heat storage/release in food chests was evaluated. Food chests made of foamed polystyrene of approximately 1350 cu. in. capacity were used. Heating pads containing 2-oz., 4-oz., and 8-oz. of trimethylolethane (TME) were compared in chests labeled B, C and D respectively. Chest A was a positive control in which no heat pad was inserted. The heating pads were placed on 4-inch high cups. Meat thermometers were inserted through the sidewall of the chests and then inserted into preheated hot dogs and allowed to rest on a paper napkin that was placed on top of the heating pad. Where no heating pad was used (the control) the hot dog rested on a cup.

The heating pads were fiberglass pouches of approximately 5"×7" and were one-half to one inch thick overall. An insulation layer of ¼ inch thickness was inserted in the bottom of each pouch. The TME particles were laid on top of the insulation layer. The outer covering of each pouch was made of siliconized fiberglass fabric. The pads were prewarmed for three hours at 225° F. in a conventional gas oven.

When the hot dogs were placed (singly) into each chest, their inner temperature registered 120° F. The top was placed on each chest and temperature reading was taken every 15 minutes thereafter from the dial which protruded on the outside of each chest. The temperature readings are presented in Table 3.

TABLE 3

| TIME (min.) | A (CONTROL) | B (2 oz.) | C (4 oz.) | D (8 oz.) |
|---|---|---|---|---|
| 0 | 120 | 120 | 120 | 120 |
| 15 | 90 | 100 | 100 | 100 |
| 30 | 80 | 90 | 90 | 90 |
| 45 | 76 | 86 | 86 | 90 |
| 60 | 74 | 84 | 84 | 86 |
| 75 | 72 | 82 | 80 | 86 |
| 90 | 72 | 78 | 78 | 84 |
| 105 | 72 | 78 | 78 | 84 |
| 120 | 72 | 74 | 74 | 84 |
| 135 | 72 | 74 | 72 | 82 |
| 150 | 70 | 72 | 70 | 80 |
| 165 | | 70 | | 80 |
| 180 | | | | 78 |
| 195 | | | | 78 |
| 210 | | | | 76 |
| 225 | | | | 74 |
| 240 | | | | 74 |
| 255 | | | | 72 |
| 270 | | | | 70 |

The results show that the heat storage/release phenomenon is functional in food storage chests. The 2 and 4 ounce pads maintained the hot dog temperature above the room temperature (70°-72° F.) for 2½ hours versus about 1¼ hours for the empty chest. The 8-ounce pad maintained the hot dog above room temperature for 4½ hours.

Figure 4:
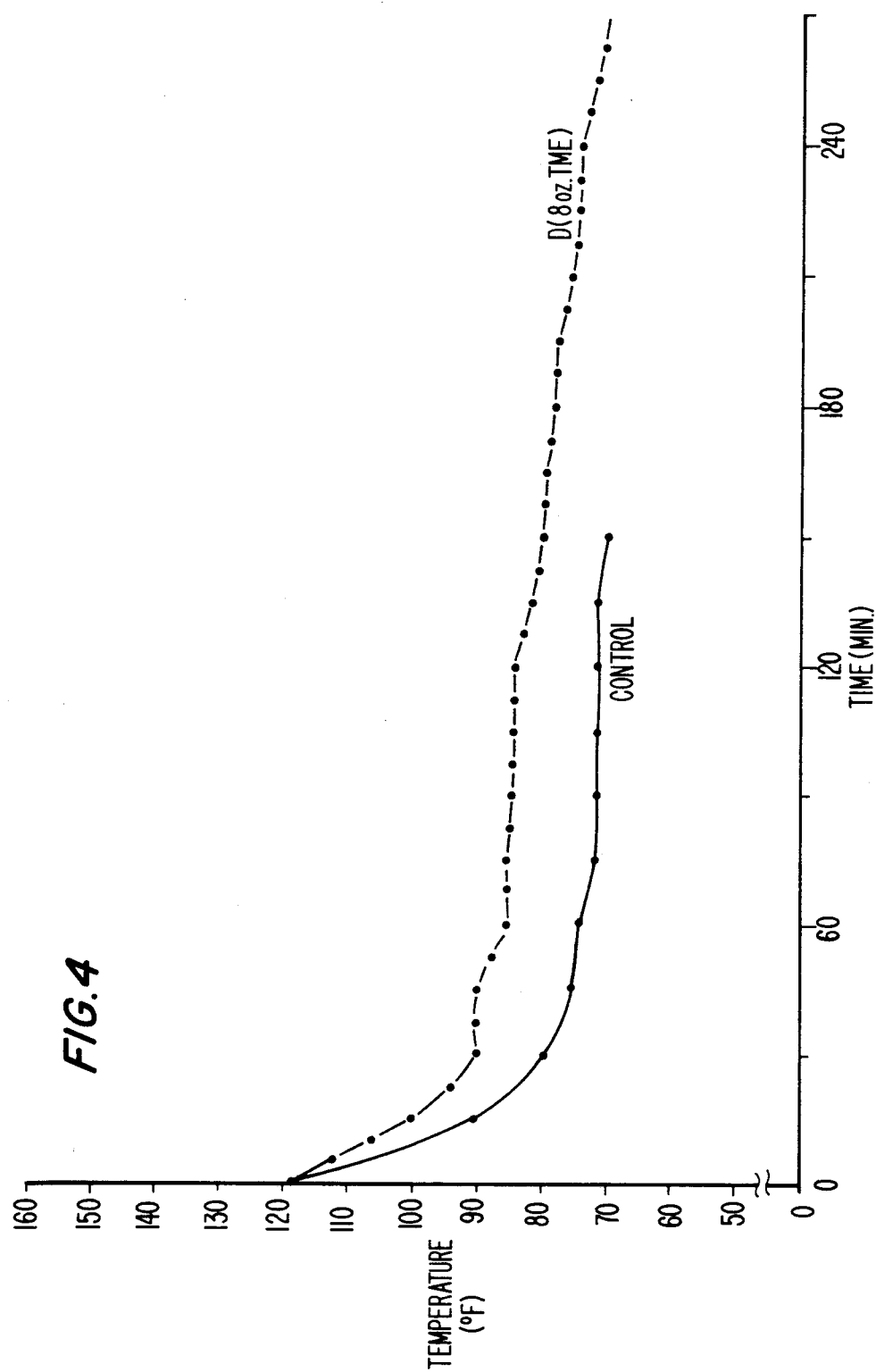
FIG. 4 is a graph showing the cooling curve of a food storage chest both with and without a heating pad containing 8 ounces of trimethylolethane.

The results suggested the existence of certain shortcomings in the test results are shown in Table 3 and FIG. 4 for optimum effect. The large inner compartment may have reduced the sensitivity of the test. Second, the hot dogs were not preheated as high as would probably be acceptable in household use. Third, the heat pads appear to have been too small for optimum warming of the chest. A more acceptable performance for the pad would be on the order of 12-16 ounces of plastic particulates.

Various other modifications, alternative constructions and equivalents may be employed without departing from the true spirit and scope of the invention, as exemplified in the foregoing description and defined in the following claims.

We claim:

1. A container for foods, said container comprising:
   a food storage volume,
   a particle storage volume in heat exchange communication with said food storage area, and
   discrete particles of a solid organic material that is solid at room temperature and exhibits a mesocrystalline transition temperature within a range of about 30° to about 200° C., said organic material being disposed in said particle storage volume.

2. A container according to claim 1 wherein said organic particulate material comprises a polyol.

3. A container according to claim 2 wherein said polyol comprises trimethylolethane, pentaerythritol, neopentylglycol, and mixtures thereof.

4. A container according to claim 1 wherein said particle storage volume is an annular space around said food storage volume.

5. A warming device comprising:
   a contact layer,
   discrete particles comprising a solid organic material that is solid at room temperature and exhibits a mesocrystalline transition temperature within a range of about 30° to about 200° C., said organic material being located in heat exchange communication with said contact layer, and
   means for regulating the temperature of said contact surface to provide a surface temperature within a range from about 35° to about 70° C.

6. A device according to claim 5 further comprising side walls attached to said contact layer and a bottom layer attached to said side walls to define an enclosed volume, wherein said side walls and said bottom layer comprise means for directing heat from said particles toward said contact surface.

7. A device according to claim 5 wherein said particles comprises a polyol.

8. A device according to claim 5 wherein said polyol comprises trimethylolethane, pentaerythritol, neopentylglycol, and mixtures thereof.

9. A method for warming, said method comprising:
   heating discrete particles of a solid plastic crystal material that is solid at room temperature and exhibits a mesocrystalline transition temperature within a range of about 30° to about 200° C., said plastic crystal material being disposed within an article of manufacture, and
   placing said article in proximity to a liquid, food, body, body part, or item for warming said liquid, food, body, body part, or item heat from the heated particles.

10. A method according to claim 9 wherein the heating comprises:
    exposing said article and said particles simultaneously to microwave radiation.

11. A method according to claim 9 wherein said particles comprise a polyol.

12. A method according to claim 11 wherein said polyol comprises trimethylolethane, pentaerythritol, neopentylglycol, and mixtures thereof.

* * * * *